Jan. 12, 1926. 1,569,093
P. KRUSE
MACHINE FOR MAKING CAN BODIES
Filed March 13, 1925   5 Sheets-Sheet 4

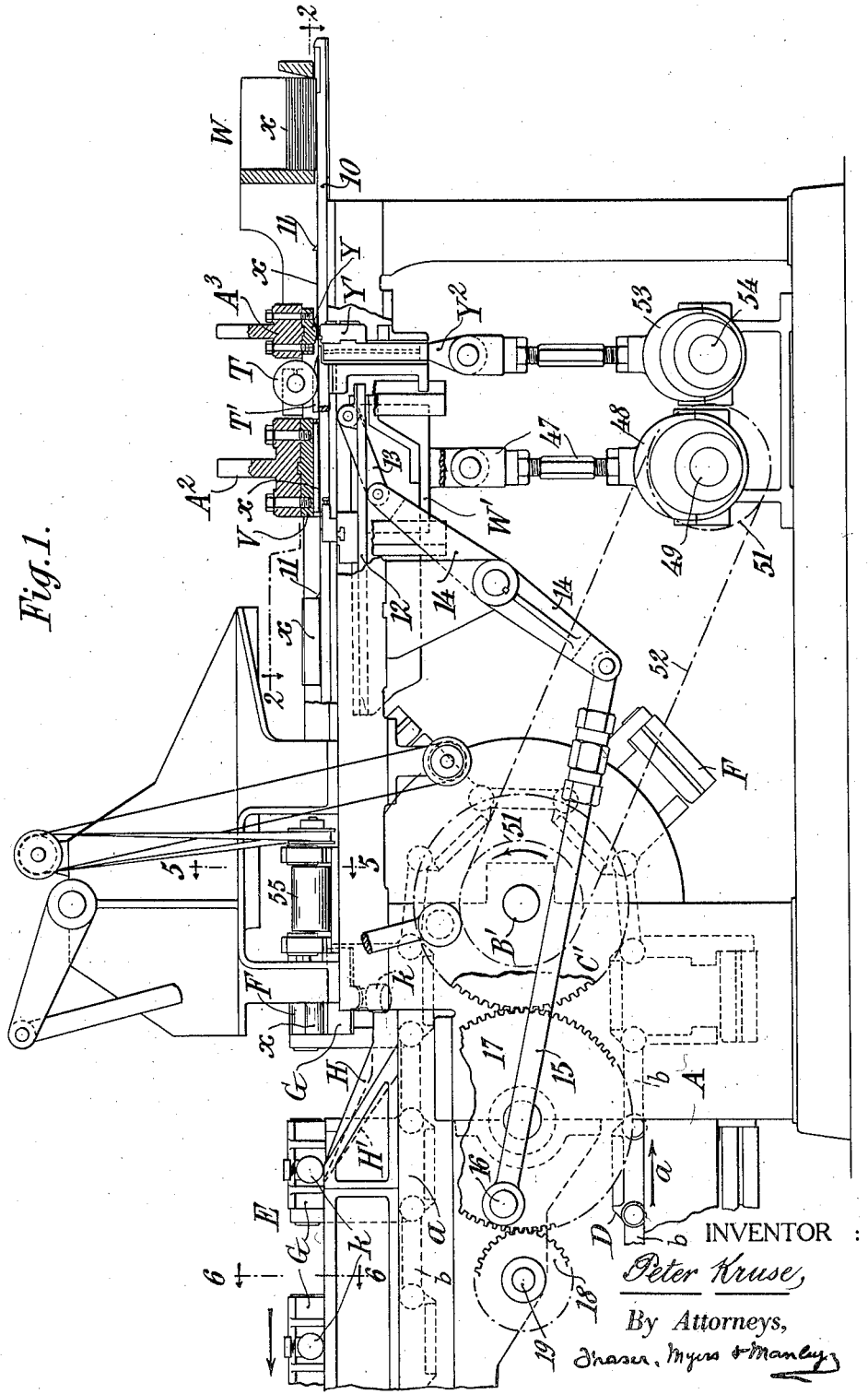

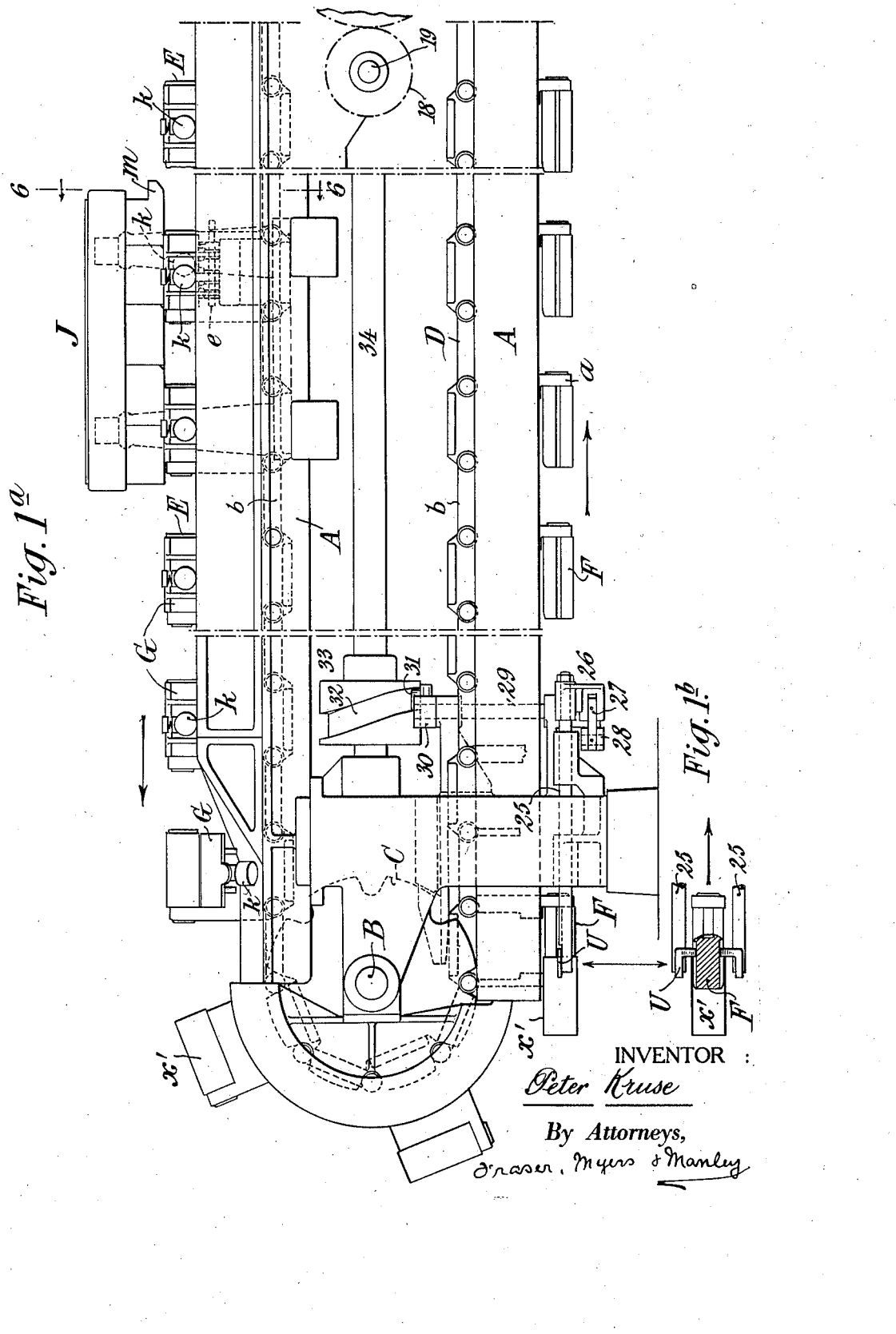

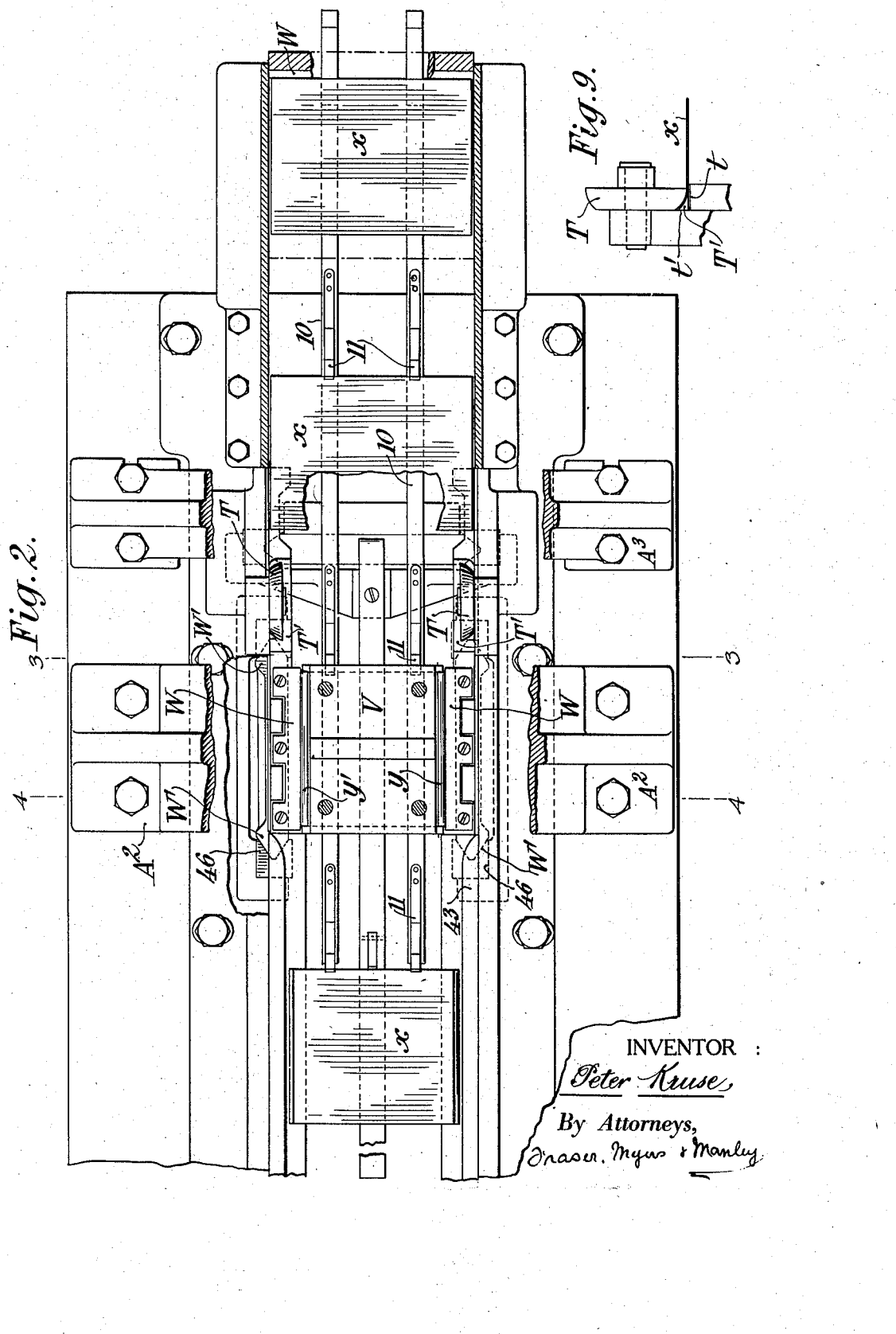

INVENTOR:
Peter Kruse
By Attorneys,
Fraser, Myers & Manley

Jan. 12, 1926. 1,569,093
P. KRUSE
MACHINE FOR MAKING CAN BODIES
Filed March 13, 1925  5 Sheets-Sheet 5

INVENTOR
Peter Kruse,
By Attorneys,
Fraser, Myers + Manley

Patented Jan. 12, 1926.

1,569,093

UNITED STATES PATENT OFFICE.

PETER KRUSE, OF BROOKLYN, NEW YORK, ASSIGNOR TO E. W. BLISS COMPANY, OF BROOKLYN, NEW YORK, A CORPORATION OF WEST VIRGINIA.

MACHINE FOR MAKING CAN BODIES.

Application filed March 13, 1925. Serial No. 15,266.

*To all whom it may concern:*

Be it known that I, PETER KRUSE, a citizen of the United States of America, residing in the borough of Brooklyn, county of Kings, city and State of New York, have invented certain new and useful Improvements in Machines for Making Can Bodies, of which the following is a specification.

This invention relates to machines for making lap seam can bodies or similar sheet-metal tubular articles, either cylindrical or of other shapes.

The machine in its preferred form is generally similar to that set forth in my Patent No. 1,046,088, granted December 3, 1912. In that machine a series of formers are carried around on an endless chain and moved intermittently: at one position a blank is fed beneath the former horn, having its edge portions, which are to constitute the seam, preliminarly curved, and being then wrapped around the horn by folders or hinged jaws, after which the folders are successively passed under a soldering iron, whereby the lapped portions are soldered together to form the seam; the formers are carried for a sufficient time to permit the soldered edges to cool so that the solder sets, after which the folding jaw or jaws which have held the edges together are released and the can body is pushed off the former horn by an ejector and fed out.

The present invention is applicable to not merely an endless chain machine, but to any machine having one or more suitable formers or horns around which blanks are successively wrapped, soldered, and fed off. The purpose of the present invention is to insure a more perfect conformance between the shape of the can body in cross-section and the horn on which it is formed. Different kinds and qualities of sheet-metal have varying degrees of pliability and resilience, so that they are more or less resisting or yielding to the forming operation; the wrapping or forming operation also affects the sheet-metal variously around different portions of the horn, those portions nearest the seam receiving less of a permanent bend or set than those portions diametrically opposite therefrom. To make accurately formed bodies which will not, when removed from the horn, spring into a shape in cross-section somewhat variant from that of the horn, involves difficulty; and where such accurate confirmation is important, some means other than those set forth in said patent is required. The present invention is designed to meet this need.

The specific object of the machine herewith illustrated is the formation of can bodies of sheet zinc. Such bodies are used as the cups or zinc elements of dry batteries. For the proper assembly of the parts of such batteries it is highly desirable to have the zinc cups turned out as accurately cylindrical as possible; and this result is successfully achieved by the present machine.

Hereinafter in this specification I will refer to the completed open ended tubular product of the machine as a "can body" in order to conform to the language of my said patent.

According to the present invention, the blank is preliminarily curved at its sides not merely for a width sufficient to form the overlapping soldered seam, but for a considerably greater width or zone approximating at each side from one-eighth to one-quarter of the circumference of the body, and being preferably about 18 or 20 per cent of the circumference. This preliminary bending is to a cylindrical curve the radius of which will vary according to the character of the metal being operated upon. If the metal has sufficient resiliency to spring back somewhat when released after bending, the radius must be somewhat shorter than that of the horn; but for a metal which may be bent to take a set from which there is no springing back (sometimes called a dead set), the radius should be the same as that of the horn. In some or most cases it is desirable to give a special preliminary bend to the edge portions which are to form the overlapping seam, and this bend may be to a slightly smaller radius than that of the adjacent zones or portions; or in some cases the same radius may be used for both. Where different radii for these curves are desirable, it is preferable to perform the preliminary bending first of the seam portions to one radius, and then later of the laterally adjoining zone portions to a different radius. After these preliminary bendings are performed upon the blank, it is fed beneath the horn and wrapped around the horn, bringing its edge portions to overlie one another in the customary manner of lap seam forming, and one or both edges are thus held while the soldering is done and until the soldered seam has cooled and set, as heretofore. The invention comprises means for accomplishing such preliminary bendings of the blank in association with the means for finally wrapping it around the horn and soldering or otherwise uniting the edges to form the seam.

The invention also involves an improved construction of the wrapping wings or folding jaws whereby the blank is carried around the horn.

The accompanying drawings illustrate an embodiment of the invention resembling in its general structure the machine set forth in my said Patent No. 1,046,088.

Figure 1 is a side elevation, partly in vertical section, of the feeding-in end of the machine.

Fig. 1$^a$ is a side elevation of the left-hand end of the machine, showing the soldering means and ejector.

Fig. 1$^b$ is a horizontal view of the ejector U shown in Fig. 1$^a$.

Fig. 2 is a horizontal section of Fig. 1 taken generally on the line 2—2 therein.

Fig. 9 is a transverse view showing a detail of the edge curving means.

Figure 5:
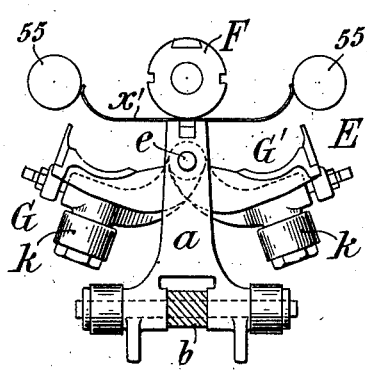
Fig. 5 is a fragmentary transverse section on a smaller scale than Figs. 3 and 4 taken approximately on the line 5—5 in Fig. 1, and showing the parts before wrapping around the horn.
Figure 6:
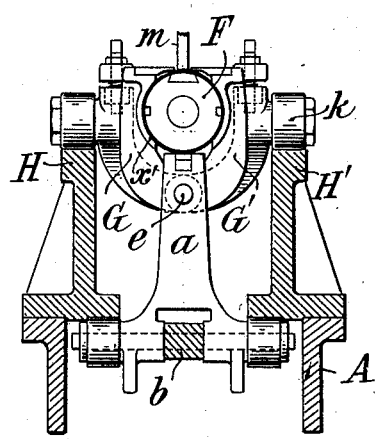
Fig. 6 is a similar cross-section to Fig. 5 taken on the line 6—6 in Fig. 1 or line 6—6 in Fig. 1$^a$, showing the blank wrapped around the horn and the soldering iron engaging the seam.
Figure 7:
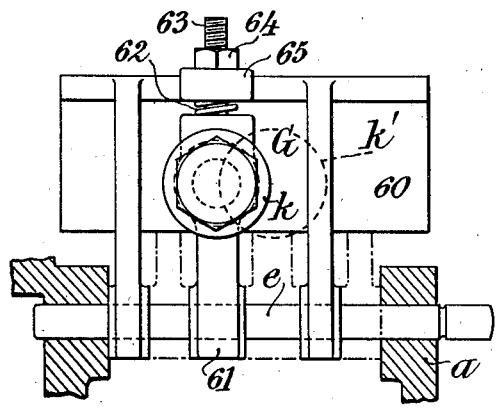
Figs. 7 and 8 are details of one of the folding wings or jaws, Fig. 7 being a side elevation, and Fig. 8 an end view partly in transverse section.

I will first refer to those parts of the machine in the accompanying drawings which correspond to similar parts in my aforesaid patent, using the same letters of reference to designate them. The moving parts are supported by any suitable framing A which provides bearings for shafts B, B' carrying sprocket wheels C, C' over which is carried an endless chain D on the links of which are carried successive formers E, E. The chain links $a$, $a$ constitute slides which are guided in suitable longitudinal slideways or channels formed in the main frame A; they are connected by links $b$, $b$ which may be simple connecting bars. Each former E comprises a horn or mandrel F, and folders comprising two hinged jaws or wings G, G'. The horn F is rigidly attached to the sliding link $a$. The folders G, G' are pivoted to this link by means of a hinge pin $e$. Between the upper part of the link $a$ and the horn F is a narrow space into which may be fed a sheet-metal blank $x$, as shown in Fig. 5, which is frictionally gripped between the two. The horn F has the shape of the can body to be made, being cylindrical, as shown, for a cylindrical body, or it may be oval or otherwise varied from the cylindrical according to the shape of the body to be formed. The folders G, G' have their inner faces of corresponding contour to the exterior of the horn. The folders may swing from the fully open position shown in Fig. 5, to the fully closed position shown in Fig. 6. These movements are accomplished by cam faces formed preferably as inclined planes H and H' which act upon projecting portions $k$, $k$ formed on the respective folders. (These portions $k$ were bosses in my said patent, but are here shown as anti-friction rollers). As the folder G for the inner lap of the seam must act in advance of the folder G' for the outer lap, the cam incline H which operates the folder G is caused to act in advance of the incline H for the folder G', as by setting one roll $k$ in advance of the other $k'$, as indicated in Fig. 7.

The soldering mechanism is shown at J (Fig. 1$^a$), and may be of any known kind. The soldering means shown includes a soldering iron $m$ which, as shown in Fig. 6, may enter between the ends of the folders G, G' to solder the seam which is limited to the space between these jaws. In my former patent, after the folders had lapped the edges to form the seam, the folder G' held them and the folder G was dropped away to afford ample room for the soldering (see Fig. 7 of said patent), but in my present construction it is suitable to keep both folders in their final positions, as shown in Fig. 6, until the soldering is done and the solder set.

The feeding and delivering means are different from those shown in my said patent. In the specific construction shown, the blanks are fed from a magazine W by reciprocating feed bars 10 carrying feed pawls 11; the bars are connected to a reciprocating slide 12 which is reciprocated through a link 13, lever 14, and connecting rod 15 from a crank stud 16 on a gear wheel 17 which is driven from a gear 18 on a driving shaft 19, and in turn drives a gear 20 on the sprocket wheel C', the gears 17 and 20 being of like pitch, so that the reciprocating feed motions are timed with the movements of the formers.

The ejecting mechanism shown in Fig. 1ª consists of a reciprocating slide comprising two rods 25 carrying ejector fingers U which enter grooves in the opposite sides of the horn, as shown in Fig. 1ᵇ, and are connected together at 26 and reciprocated through a link 27 and lever arm 28 on a shaft 29 carrying an arm 30 having a lug or roller 31 engaging a cam slot 32 in a cam 33 carried on a longitudinal shaft 34 timed (through gearing not shown) exactly with the shafts B and B'. This delivery mechanism makes one reciprocation as each horn comes to it carrying a completed can body x'.

For the preliminary edge bending of the flat blanks the said patent shows (see Fig. 4) at each side bending rolls T and T' between which the edges of the blank which are to constitute the lap seam are passed during the feeding in of the blank. In the present machine this edge bending is accomplished at each side between a roll T above the blank and a cam shoe T' beneath the roll, the upper face of the shoe T' being developed by a twisting curve from a flat entering end $t$ to a curve $t'$ (see Fig. 9) coinciding with the curved face of the roll T, so that between these surfaces the edge portion of the blank $x$ is bent up. The roll T may be driven or not, as desired. This means for preliminarily curving the lap seam edges of the blank accomplishes the same result as the coacting rollers of said patent.

For a more complete description in detail of the various parts herein referred to as similar to those of my said patent, reference may be made to the specification of that patent.

I will now proceed to describe those features of the machine which constitute an embodiment of the present invention.

Figure 10:
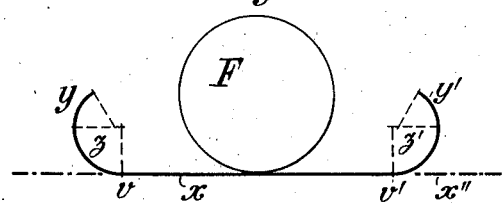

Referring to the diagram Fig. 10, the blank $x$, which in its original flat position is shown partly in dotted lines at $x''$, is first curved at its overlapping seam portions $y$, $y'$, which may be done by the means thus described; and the adjoining zones $z$, $z'$ are curved by any suitable means acting preferably after the edge bending of the portions $y$, $y'$, so that the blank appears as shown by the full line in Fig. 10; then subsequently by the action of the folders or wrapping jaws G, G', the blank is carried around the horn F in the same manner as heretofore, so that the edge seam portion $y'$ is lapped over the portion $y$. The preliminary bending of the zones $z$, $z'$ is for the purpose of giving the sheet-metal such set that the can body, when removed from the horn, will precisely conform thereto in its cross-sectional outline. It has been found that the portions of the blank extending from approximately between the points $v$, $v'$ in Fig. 10 receive from the action of the folding wings G, G' a much closer conformity to the horn by virtue of the wrapping action, than do the portions which lie beyond the points $v$, $v'$ (these points being understood to be only approximate in location), so that without the preliminary bending of the portions $z$, $z'$ these portions in the soldered can body tend to unbend to a curve of longer radius than that of the horn, and consequently distort the cross-sectional contour of the body, bringing its seam nearer to the middle of the blank diametrically opposite than when the body was still on the horn and constrained by it. This preliminary bending of the portions $z$, $z'$ is the principal feature of the present invention. The diagram Fig. 10 shows the blank after this bending and just before it is carried by the folding wings G, G' around the horn. The bending operation may temporarily bend the blank to precisely the arcs shown at $z$, $z'$; and these arcs may coincide with the arcuate surfaces of the horn, or, in other words, may be of the same radius, or different radii may exist; these details of curvature being determined according to the specific qualities of the metal under treatment. The preliminary bending of the zones $z$, $z'$ will with most metals require to be done between curved surfaces (approximately segments of cylinders) having curvatures of a radius somewhat smaller than that to be imparted to the blank in order to allow of the springing back of the blank by reason of the resilience of the metal; such springing back brings it to the contour shown (for example) in Fig. 10. If, however, the metal is one which will receive a dead set without any springing back, it will be suitable to bend it between surfaces having precisely the desired curvature. The relation between the curves of $y$ and $y'$, and the curved face of the horn, is determined by similar considerations. In the case of somewhat resilient metal the tendency to partially straighten out after the can body is stripped from the horn is compensated for by preliminarily bending the portions $z$, $z'$ to a curve of smaller radius than that of the horn, so that the action of the folding wings is to partially flatten these portions against the horn; by this means the varying set given to the metal by the action of the folding wings with respect to the portions of the blank on opposite sides of the points $v$, $v'$ is compensated for, and a body is produced which when stripped from the horn has precisely the same cross-sectional contour as the horn. This is equally true whether the horn be of circular cross-section, as in Fig. 10, or of some other cross-section within suitable limits.

Figure 4:
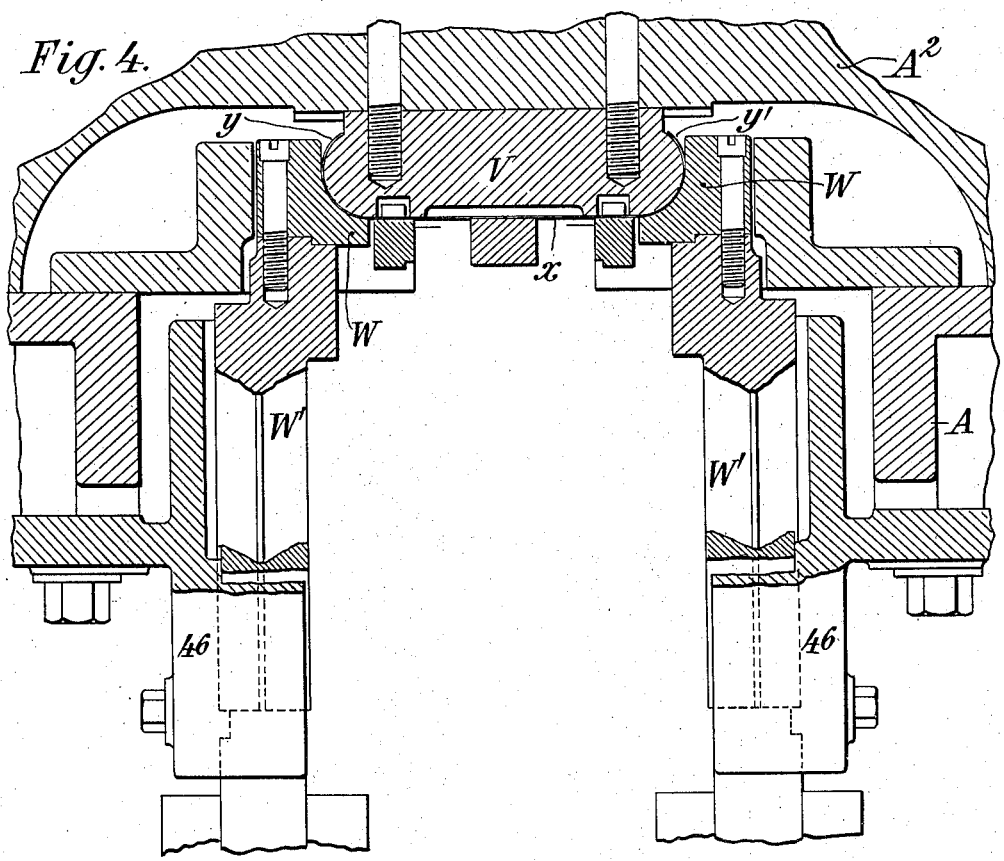
Fig. 4 is a fragmentary transverse section on the line 4—4 in Fig. 2, showing the parts in a different position from Fig. 3.
Figure 3:
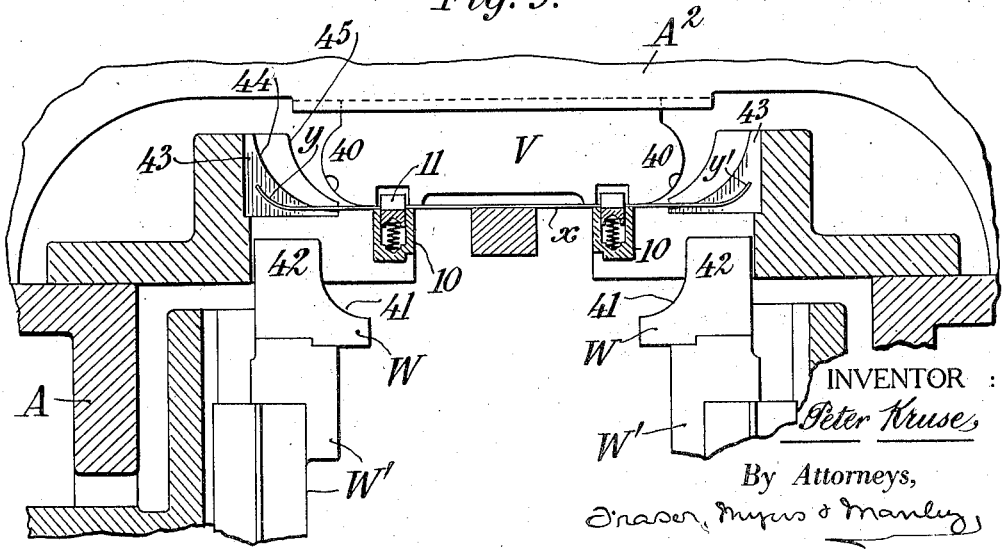
Fig. 3 is a fragmentary transverse section on the line 3—3 in Fig. 2, on a larger scale.

Having thus explained the operation to be performed upon the zone portions $z$, $z'$, I will now describe the preferred means for performing these operations. Referring to Figs. 3 and 4, the blank $x$, having its edge seam portions $y$, $y'$ already bent up in any suitable way such as described, is carried along by the reciprocating feed bars 10, 10, being pushed by the pawls 11, 11 thereon, and is carried underneath a conforming die V which is shown as fastened beneath a cross frame $A^2$. On opposite sides this die is formed with curved portions 40, 40, against which the portions $z$, $z'$ of the blank are to be conformed. Beneath the die V are folder jaws W, W having curved faces 41, 41 conforming to the curved faces 40 on the die V. These jaws are shown down in Fig. 3, and from this position they are moved up to the position shown in Fig. 4; in this movement the upper faces 42 of the jaws encounter the lateral portions of the blank and bend them upwardly, the bending being completed by a pinching action between the surfaces 40 and 41 which in the final position conform to each other, as shown in Fig. 4. The jaws W, W then move back to their original position, whereupon if the sheet-metal is resilient it will spring slightly away from the curves 40, 40, a circumstance which facilitates the further feeding along of the blank. Beyond the jaws W, W are stationary guiding shoes 43 having curved faces for receiving the curved portions $z$, $z'$ of the blank, these faces being skewed or tapered from the entering curve 44 to the emerging curve 45. As the blank is moved past these guiding shoes 43 to the position shown at $x$ at the left in Fig. 2, it is then engaged by the folding or wrapping wings or jaws G, G' (see Fig. 5) and folded around the horn during the advancing movement of the horn and folders (due to the rollers $k$, $k'$ traveling up the inclines H, H', as already described), whereby the blank is wrapped around the former, as shown in Fig. 6.

The jaws W, W are shown as carried on a pair of slides W' sliding in fixed guides or ways 46, 46, and each actuated by a connecting rod 47 from an eccentric 48 on a shaft 49 which is shown as driven from the shaft B' by sprocket wheels 50, 51 and a connecting sprocket chain 52. In operation the intermittent feeding means 10, 11 stops with a blank beneath the die V, while the eccentric 48 is lifting the slides W' and bending dies W, and after these descend, the next forward movement of the feed carries the bent blank ahead and brings the next blank into position for bending. Obviously other reciprocating means for moving the bending jaws W may be substituted.

The specific proportions illustrated in the figures already referred to, which are designed for operation on sheet zinc, may be stated as giving one instance of the practical working out of the invention. Taking the radius of the cylindrical horn F as 100, the radius of $z$ or $z'$ is approximately 60, and of $y$ or $y'$ is approximately 45. The die surfaces 40, 41 for producing the curves $z$, $z'$ have a radius of approximately 55, and the curved surfaces of the bending rolls T and shoes T' have radii of approximately 40; these latter radii being just sufficiently smaller than those of the curves $z$, $y$ to allow for the resilient springing back of the metal after bending.

Figure 11:
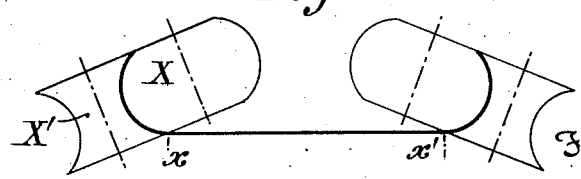

For other metals, and still assuming a cylindrical horn, the respective radii might be, for example, 90 and 85 instead of 60 and 45; or other radii might be necessitated by differences in the qualities of the sheet-metal being operated upon. In some cases it is unnecessary to curve the seam portions $y$, $y'$ to a smaller radius than the adjoining portions $z$, $z'$. In such cases the preliminary bending means T, T' may perhaps be omitted, and the bending means V. W proportioned to do the entire bending. This would not be accomplished by the specific bending means V, W shown if the bent portions $y$, $z$, $y'$, $z'$, are of the width shown in Fig. 8, for example. For such width it is necessary to employ two successive bending means if the specific secondary bending means shown in Figs. 3 and 4 are used; in such case the preliminary edge bends $y$, $y'$ are merely wrapped around the upper part of the curved portions 40 of the die V, as clearly shown in Fig. 4. It would, however, be quite possible by the adoption of other bending means of broader scope, to perform all the bending outside of the points $v$, $v'$ by one bending mechanism instead of two. For example, such bending may be accomplished between diagonally-arranged bending rolls X, X', as shown in Fig. 11.

Figure 12:
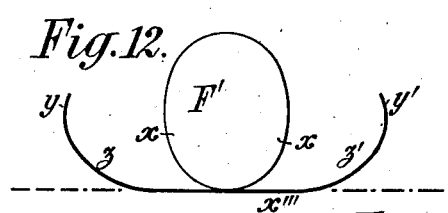
Figs. 10, 11 and 12 are diagrams.

It is to be understood that the present invention is applicable to can bodies of other than cylindrical form, and as an illustration thereof is shown in Fig. 12 a diagram illustrating a horn F' of elliptical contour, and a blank $x'''$ having its preliminary bends $y$, $y'$ and $z$, $z'$, which are similar to those shown in Fig. 10, except that their curves, instead of being segments of circles, are segments of ellipses. Similar variances may be made with respect to any other cross-section of horn which may be adopted.

In Fig. 1 is shown a crosshead $A^3$ having a die Y and a movable coacting die Y' carried on a sliding frame $Y^2$ driven in similar manner to the frame W' from an eccentric 53 on a shaft 54. This mechanism forms no part of my present invention, and is here illustrated only because it happens to be used on the same machine. It may accomplish any one of a variety of purposes, as, for example, the stamping or indenting of the metal of the blank for the purpose of any desired inscription or lettering.

For the soldering of the lap seam any known or suitable soldering mechanism may be provided. In Fig. 5 rollers 55, 55 are shown, which may be used for applying acid or solder to either or both of the edge portions $y$, $y'$ which are to form the lap seam. One of the same rollers 55 is shown in Fig. 1. As this is a well-known expedient in the soldering of lap seam cans, no further description is necessary.

Figure 8:
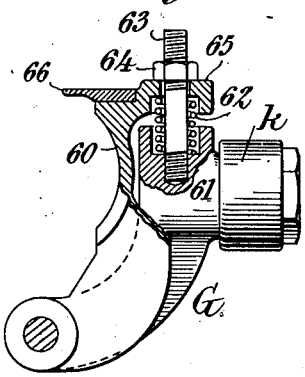

The folding or wrapping wings or jaws G, G' are of improved construction, as best shown in Figs. 7 and 8. Fig. 7 shows one of the jaws in full lines, the other, which is a reverse duplicate thereof, being indicated in dotted lines. The jaws consist each of a wrapping portion 60 which conforms to a segment of the horn, and an actuating member 61. Both are pivoted on the same pin $e$, and thereby connected to the link $a$. The members 61 carry the rollers $k$ which ride on the rails H, H'; by the reversal of the like members on their alternated position, one of the rollers $k$ is brought to the position $k'$ in Fig. 7, so that in the travel of the chain the roller $k$ moves in advance of the roller $k'$, and consequently, if the ascending inclines are coincident, lifts its jaw in advance of the other jaw. The pressure is communicated yieldingly from the members 61 to the jaws 60; this is most conveniently accomplished by interposing a spring 62, as shown in Fig. 8. A stud 63 is made fast to one member and carries a stop nut 64 engaged by an ear 65 on the folding wing 60, the play between the parts being ample for affording the requisite range of yielding movement. Each wrapping member 60 has a blade 66 fastened to it and extending partly over the top of the horn, for engaging the blank near the lap seam.

The present invention is susceptible of considerable modification within the scope of the appended claims, without departing from its essential features.

What I claim is:—

1. In a body making machine comprising a horn, means for wrapping the blank around the horn, and means for soldering the overlapping edges, the combination therewith of means for preliminarily bending the flat blank for a zone extending beyond its lap seam to either side toward its middle to a curve conforming approximately to the curve of the corresponding portion of the horn, whereby to ensure that the completed body will have a contour in cross-section conforming closely around its circumference to the contour of the horn.

2. In a body making machine comprising a horn, means for preliminary curling the edges of a flat blank, means for then wrapping the blank around the horn, and means for soldering the overlapping edges, the combination therewith of means for preliminarily bending the flat blank for a zone extending beyond its lap seam to either side toward its middle to a curve conforming approximately to the curve of the corresponding portion of the horn, whereby to ensure that the completed body will have a contour in cross-section conforming closely around its circumference to the contour of the horn.

3. In a body making machine comprising a horn, means for wrapping the blank around the horn, and means for soldering the overlapping edges, the combination therewith of means for preliminarily bending the flat blank for a zone extending beyond its lap seam to either side toward its middle to a curve conforming approximately to the curve of the corresponding portion of the horn, but of somewhat more convex curvature, so that such zone will be thus curved first to greater convexity than its final contour, and in the wrapping operation will be conformed to the horn by slightly flattening it to lessen convexity, sufficiently to cause the metal of the blank to take a final set conforming such zone to the contour of the horn.

4. In a body making machine according to claim 1, the preliminary bending means comprising a forming die and bending jaws relatively movable to bend the metal blank between them.

5. In a body making machine according to claim 1, the preliminary bending means comprising a stationary forming die having convex portions and reciprocating bending jaws moving toward and from the forming die, and said jaws having concave faces adapted to bend and pinch the blank against the concave faces of the forming die.

6. In a body making machine according to claim 2, the preliminary curling and bending means comprising primary curling devices for first bending the edge portions of the blank, and secondary bending dies comprising a forming die and bending jaws engaging the blank on zones adjacent the preliminarily bent portions, and relatively movable to bend such zones between them.

7. In a body making machine comprising a horn and means for wrapping the blank around the horn, such means comprising pivoted jaws engaging the horn on opposite sides, each jaw consisting of a wrapping portion conforming to a portion of the exterior of the horn, and an actuating member, with a yielding member between for elastically transmitting pressure between them, and means for imparting movement to the actuating members to close the jaws against the horn.

8. In a body making machine comprising a horn and means for wrapping the blank around the horn, such means comprising pivoted jaws engaging the horn on opposite sides, a carrier for said horn, and wrapping means and longitudinal rails having cam inclines, the wrapping members consisting of pivoted jaws having rollers for travelling on said rails, the roller of one jaw set in advance of the other, whereby in the wrapping movement to cause that jaw to close ahead of the other.

In witness whereof, I have hereunto signed my name.

PETER KRUSE.